United States Patent [19]
Woolley

[11] 3,765,630
[45] Oct. 16, 1973

[54] PORTABLE LOAD SUPPORTING APPARATUS

[76] Inventor: Hoyt B. Woolley, 234 Fieldstream Ln., Idaho Falls, Idaho 83401

[22] Filed: Dec. 16, 1971

[21] Appl. No.: 208,805

[52] U.S. Cl............... 248/165, 248/166, 248/188.6, 248/188.91
[51] Int. Cl......................................... F16m 11/32
[58] Field of Search.................... 248/165, 168, 169, 248/170, 171, 188, 188.6, 188.91, 166, 434; 17/44.2; 211/178 A

[56] References Cited
UNITED STATES PATENTS

| 1,456,356 | 5/1923 | Bentley | 248/169 X |
| 1,745,845 | 2/1930 | Ebbecke | 248/170 |
| 672,705 | 4/1901 | Halladay | 248/170 X |
| 3,181,542 | 5/1965 | Bareis | 248/168 X |
| 3,066,958 | 12/1962 | Bergin et al. | 248/165 X |

FOREIGN PATENTS OR APPLICATIONS

| 230,735 | 8/1963 | Austria | 248/171 |

Primary Examiner—Marion Parsons, Jr.
Assistant Examiner—Richard L. Stroup
Attorney—Thomas B. Van Poole et al.

[57] ABSTRACT

A portable collapsible load supporting apparatus that may be used to lift and hold in place heavy objects and may have particular use to support wild game for field dressing. The apparatus includes a vertical shaft from which the load may be supported and radially extending rods pivotally connected to one end and a plurality of arms pivotally connected to the other end of the shaft and extending downwardly and outwardly to be received and supported within a socket means. Each free end of each arm and each rod are received in the head end of the socket means while the tail end is vertically aligned with a telescopic supporting leg and angularly disposed from the centerline of the head end. The pivotally connected arms and rods may be folded back against the shaft for ease of transportation.

7 Claims, 6 Drawing Figures

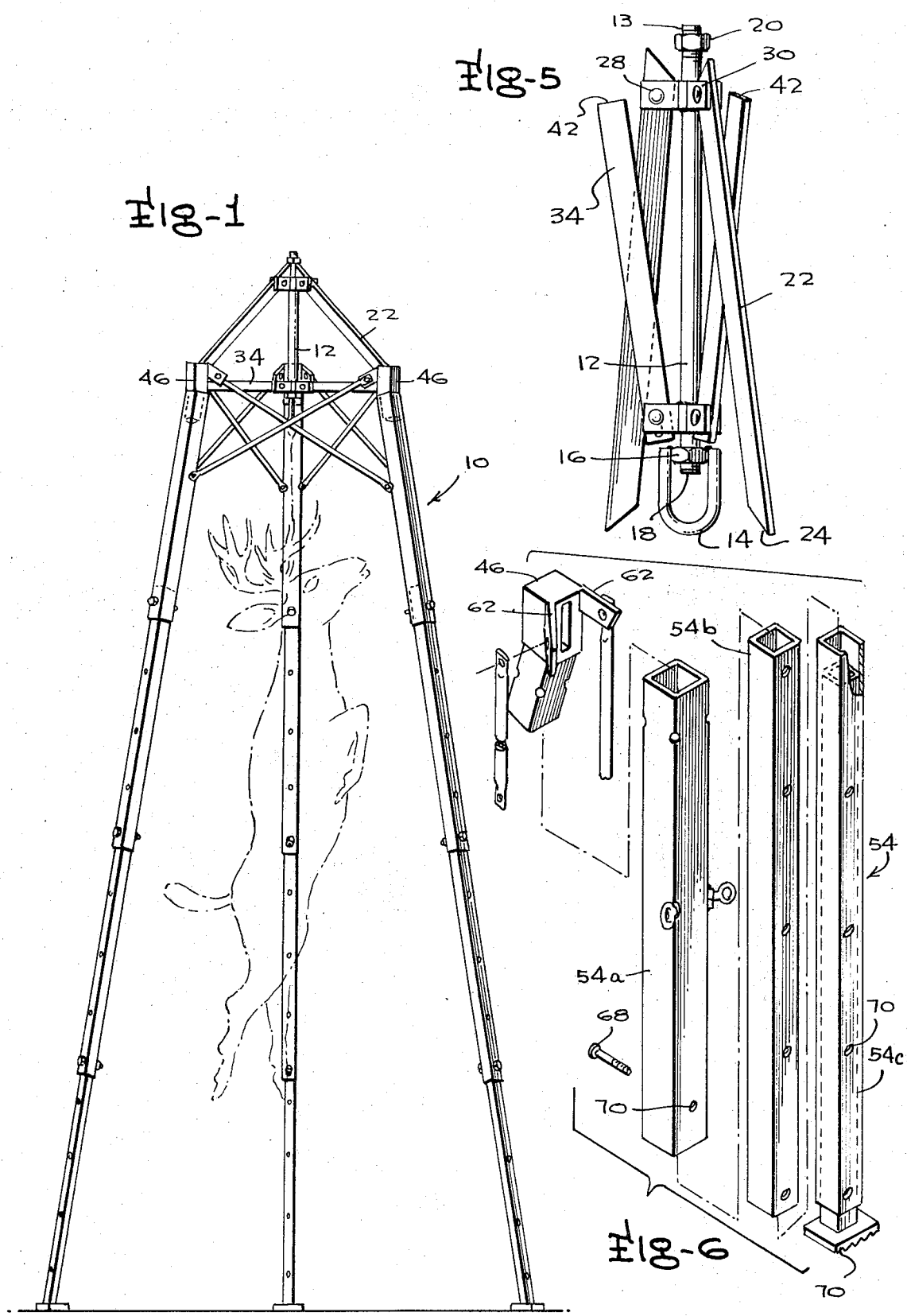

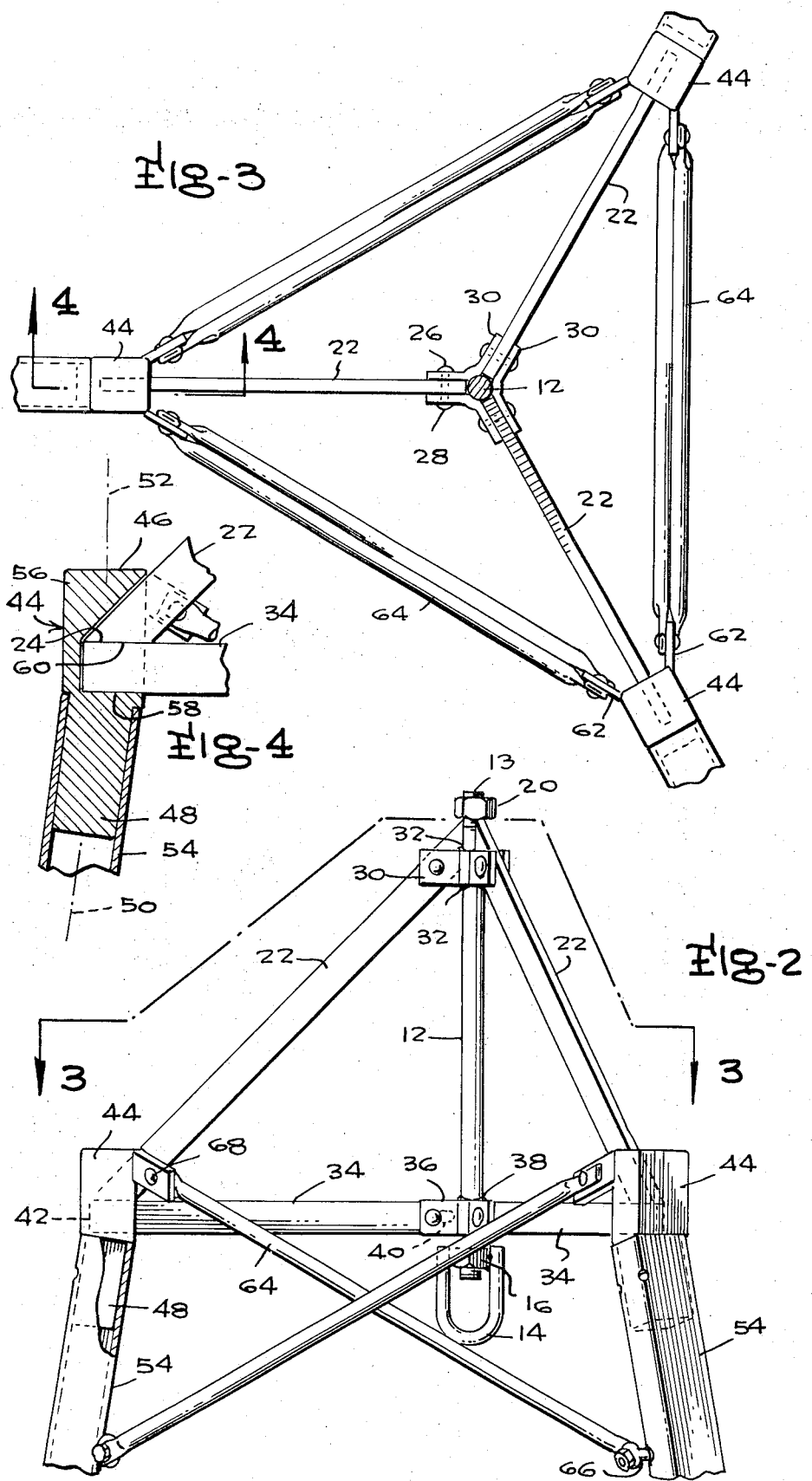

PORTABLE LOAD SUPPORTING APPARATUS

This invention relates generally to a load supporting apparatus that may be collapsed for easy transportation. More particularly, the present invention relates to a load handling apparatus which has particular adaptation for use in supporting field game for purposes of skinning and disemboweling an animal while in a suspended position and at the location where it has been killed.

BACKGROUND OF THE INVENTION

The present invention will be described as having particular utility for field game dressing, however, it is to be understood that the load supporting apparatus of the present invention may be useful to support any object of varying size or shape.

In the past, hunters who killed various game animals such as the deer or moose and the like, either skinned and disemboweled the animal at the location where the animal was killed or else dragged the animal or attempted to carry the animal to a more suitable location to permit a dressing operation. In either of these approaches, the animal was exposed to the dirt, leaves and grass upon which the animal was in contact. If transported by dragging or carrying, there frequently resulted damage to the carcass or the embedment of dirt, dust or other foreign matter in the meat, necessitating during trimming a substantial loss in the available meat. Of course, if the animal were not dressed at the spot where killed or at a convenient location where it may have been dragged or otherwise transported, it it well known that there is a likelihood that unpalatable tastes may result in the meat.

It is well recognized that it is desirable that the animal be dressed at the location where it has been killed to minimize the time loss in dressing and also to eliminate the arduous task of transporting the carcass. Current methods of supporting the carcass for field dressing have been generally limited to, for example, the chance location of a convenient tree limb, however, in most cases the dressing of the carcass would take place on the ground where it would be susceptible to pick up all undesirable foreign matter.

Another problem that faced the hunter was how to be able to safely leave the carcass for even a short time without the possibility that some predatory animal would not find an easy mark.

OBJECTS OF THE INVENTION

It is the principal object of the present invention to provide a load supporting apparatus of general utility which is collapsible and portable. It is also an object of the present invention to provide a portable collapsible load supporting apparatus for particular use in big game field dressing which will support a carcass in a suspended position in order to permit disemboweling, skinning, and quartering, if desired.

It is also a more particular object of the present invention to provide a portable, collapsible load supporting apparatus which is simply and easily set up and collapsed and which may be transported in a simple, easily handled disassembled condition.

Another and more particular object of the present invention is the provision of a plurality of pivoting arms and rods which are uniquely held in a socket connected to each extensible leg in order to permit ease of setting up and collapsing the apparatus.

A further and more particular object of the present invention is the provision of a unique socket which receives a radially projecting rod and downwardly extending arm into a relatively fixed position to support a central shaft upon which a load is supported.

These and other objects of the present invention will be more apparent upon careful study of the following specification and drawings wherein:

THE DRAWINGS

FIG. 1 is a side-elevational view of the portable collapsible load supporting apparatus of the present invention which includes, for illustration only, a typical big wild game animal.

FIG. 2 is a side-elevational view partly broken away of the outwardly extending arms and radially directed rods supporting the central shaft and positioned in the socket means.

FIG. 3 is a view taken along lines 3—3 of FIG. 2, best illustrating the supporting struts connected to the socket means at one end and the supporting leg at the other end.

FIG. 4 is a cross-sectional view partly broken away, taken along lines 4—4 of FIG. 3 best illustrating the positioning of the outwardly extending arm and radially extending rod being received in the socket in the head end of the socket means and the angularly disposed tail connected to the supporting leg.

FIG. 5 is a perspective view of the shaft and the arms and rods in collapsed condition ready for transport or assembly into set up condition.

FIG. 6 is an exploded view of the plurality of telescoping leg section and the socket means with connecting struts.

DESCRIPTION OF PREFERRED EMBODIMENT

In FIG. 1 the portable collapsible load supporting apparatus of the present invention is generally depicted by the numeral 10. The apparatus is formed with a central shaft 12 having at one end a suitable connecting link such as closed U-bolt or eye 14 that may be welded to conventional hex nut 16. The eye 14 is removably fastened onto the shaft 12 by means of threading corresponding to the threading of the hex nut 16. The eye forms a supporting means for any load that is desired to be suspended from the apparatus such as a big game animal, as best shown in FIG. 1. The upper end of the shaft 12 is threaded at 13 to receive conventional hex nut 20.

As best shown in FIGS. 2, 3 and 5, a plurality of arms 22 having ends 24,24 cut at an angle, preferably a 45° angle, and pivotally connected at 26 by means of suitable bolts 28 which pass through the cloverleaf arrangement of angle bars 30 about the shaft 12. As shown, there are three pivoted arms 22 and 3 suitably disposed angle bars 30 which hold the ends of the arms 22 and are pivoted about suitable openings in the arms to receive bolts 28. The angle bars are secured to the shaft in any convenient manner as by welding 32 which may be above and below the apex of the angle iron in contact with the central shaft as shown in FIGS. 2 and 3. The arms 22 are angled at the pivoted end 24 to adjust radially outwardly and face downwardly. In this position as shown in FIG. 2, nut 20 may be tightened down to secure the arms from falling to the collapsed condition as shown in FIG. 5.

To further support the central shaft 12, a plurality of radially extending rods or bars 34 are pivotally connected to angle bars 36 which may be similar to angle bars 30 and secured at 38 in the same manner by welding. Bars 34 are each provided with a slot 40 at the end adjacent the shaft. This slot is elongated in an axial direction in order that the rod 34 may pivot upwardly for folding. The ends 42 of rods 34 are square, unlike the angled ends 24 of the arms 22, as best shown in FIG. 5. The ends 24 and 42 of the coplanar arms 22 and rods 34 are received in a unique socket holder 44, as best shown in FIG. 4. The socket holder 44 is composed of a head end 46 and a tail end 48. The axis of the tail 48 shown at 50 is at an angle of approximately 10°, plus or minus 5°, from the vertical axis 52 of the head 46. The tail of the socket means is adapted to fit into a hollow leg 54 as may be seen in FIG. 4.

The socket holder 44 may be cast as an integral piece with a socket 56 in the head end. The socket as best shown in FIG. 4 is trapezoidal in shape, having a bottom 58 which is designed to be horizontal when the apparatus is positioned on level ground and is from 95° – 105° from the axis 50. As shown, the angled end 24 of arm 22 remote from shaft 12 abuts the top portion of rod 34. When the arm 22 and the rod 34 are fully inserted into the socket 56 as shown in FIG. 4, the arms 22 wil be fixed in position as will the radial rod 34. No other fastening or securing means is necessary to maintain the arms and rods in their respective sockets provided the socket holder 44 remains in position.

In order that the legs be maintained in proper position and that the socket holder is maintained with the socket filled with the end of the arm and rod, a pair of fingers 62 are suitably secured as by welding or integral casting to the socket holder at the head 46. As shown in FIGS. 3 and 4, the fingers 62 include between them an angle of 120° and each extends downwardly from the horizontal about 50°, plus or minus 10°. Each of the fingers 62, receives one end of a strut 64, the other end of the strut being secured to an adjacent leg 54 by means of eye bolt 66 secured to the leg 54 at a position axially removed from the socket holder 44. The leg of the strut 64 is secured in similar fashion as by bolts 68 to the respective fingers 62. By utilizing crossed struts 64 as best shown in FIG. 2, the legs are fully supported and each socket holder is filled with the ends of an arm and rod enabling the apparatus to be capable of supporting heavy weights.

It is contemplated that the metal utilized to form the apparatus would be of light, strong nature, such as aluminum or magnesium. Of course, iron or steel would be usable, but its great weight makes it less desirable for use on a portable apparatus. It is found that aluminum is quite suitable to be used throughout the apparatus.

In order to obtain greater height for the apparatus to support larger game, sections 54a, 54b and 54c may be utilized which are telescopically received within each other and held at any degree of extension by bolts 68 which pass through cooperating openings 70 suitably positioned axially along the leg section 54a – 54c. A foot 70 which is telescopically received in the bottom section 54c may also be utilized. No limit is placed upon the number of sections that may be used or the shape of the sections. As shown, the leg sections are square or rectangular, however, legs with the round cross section are entirely suitable and for many purposes preferable.

As shown in FIG. 5, the apparatus may be collapsed after removing the strut 64 and removing the arms 22 and rods 34 from their respective sockets 34, the bolt 20 may be unloosened to release the ends of the arms 22 at which time the shaft with the plurality of arms and rods may be removed. The arms will then pivot downwardly in a collapsed fashion while the rods 34 upon moving outwardly within the slot 40 may then be pivoted upwardly in a fashion as shown in FIG. 5. Upon disconnecting the telescopic sections 54a, 54b and 54c and removing the socket means 56 and strut 64, the entire apparatus is disassembled and ready for being transported.

One of the important features of the present invention is the fact that the apparatus may be positioned or uneven ground simply by shortening anyone of the telescopic legs, and this will in no way effect the balance or rigidity of the apparatus.

I claim:

1. A portable collapsible load supporting apparatus comprising:
    a vertically disposed shaft having means for supporting a load at one end,
    a plurality of radially extending rods pivotally connected to said end,
    a plurality of arms pivotally connected to said shaft remote from said end and extending downwardly and outwardly therefrom to support said shaft,
    socket means removably receiving the free ends of said arms and said rods remote from said shaft to prevent movement thereof relative to said shaft,
    said socket means being slidably received at a tail end into said leg,
    each said socket means being connected to an apparatus supporting leg whereby the ends of each said arm and rod are removably fixed in said socket means to support said shaft in a raised position.

2. A portable collapsible load supporting apparatus comprising:
    a vertically disposed shaft having means for supporting a load at one end,
    a plurality of radially extending rods pivotally connected to said end,
    a plurality of arms pivotally connected to said shaft remote from said end and extending downwardly and outwardly therefrom to support said shaft,
    socket means removably receiving the free ends of said arms and said rods remote from said shaft to prevent movement thereof relative to said shaft,
    each said socket means being connected to an apparatus supporting leg whereby the ends of each said arm and rod are removably fixed in said socket means to support said shaft in a raised position, and said socket means including a socket having a vertical cross-sectional shape identical to the vertical cross-sectional shape of said rod and arm when coplanar and coextensive.

3. The apparatus of claim 2 including:
    said shape of said socket being trapezoidal.

4. The apparatus of claim 2 including:
    said shape of said socket having vertical sides and a horizontal bottom.

5. The apparatus of claim 4 including:
    said bottom being at an angle with the axis of said leg between 95° and 105°.

6. The apparatus of claim 2 including:
said rods being substantially horizontal and each said arms being coplanar with a corresponding rod,
said socket means comprising a head end for receiving said arm and rod and a tail end, said tail end being connected to said supporting leg.

7. The apparatus of claim 2 including:
said rods being substantially horizontal and each said arms being coplanar with a corresponding rod,
said socket means comprising a head end for receiving said arm and rod and a tail end, said tail end being connected to said supporting leg,
said shaft having means at the other end for engaging said pivotally connected rods and maintaining said rods in outwardly extended position,
said socket means being slidably received at a tail end into said leg,
said shape of said socket having vertical sides and a horizontal bottom, and
said bottom being at an angle with the axis of said leg between 95° and 105°.

* * * * *